Dec. 26, 1950      R. C. KEMBER      2,536,004
HANGER
Filed Feb. 26, 1948.
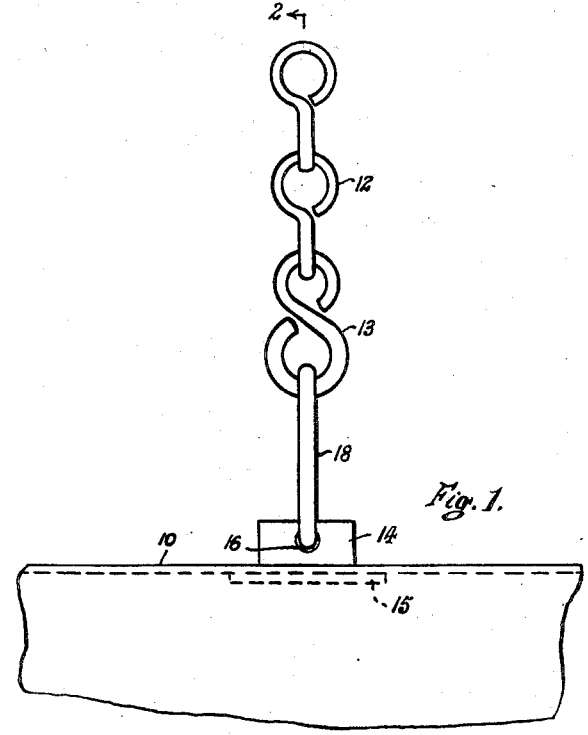
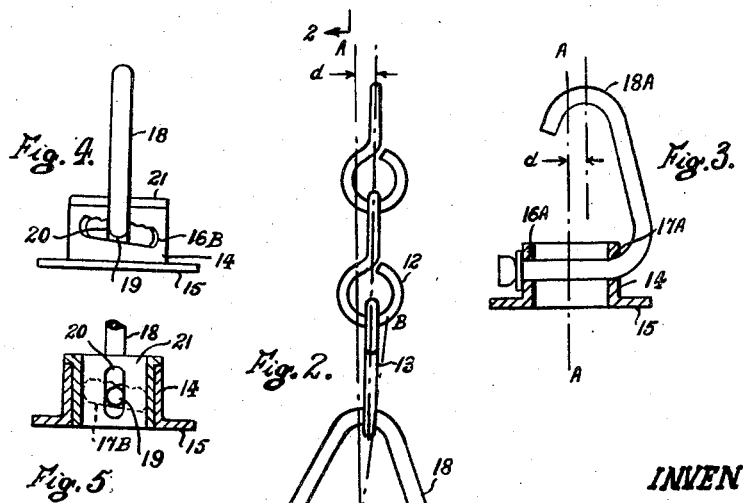
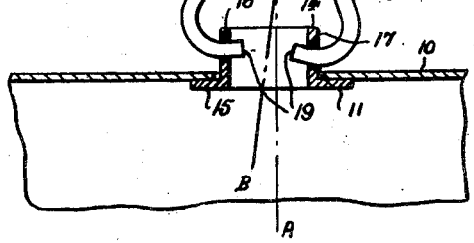
INVENTOR,
RAYMOND CHARLES KEMBER
By Lawrence Burns
ATTORNEY.

Patented Dec. 26, 1950

2,536,004

UNITED STATES PATENT OFFICE 2,536,004

HANGER

Raymond Charles Kember, London. England, assignor to Thorn Electrical Industries Limited, London, England, a company of Great Britain Application February 26, 1948. Serial No. 11,027
In Great Britain November 25, 1946

8 Claims. (Cl. 248—317)

This invention relates to articulated suspension members adapted to secure pendant articles, such for example as electric lamp-holder and reflector assemblies.

An object of this invention is to provide a simple and effective device providing an articulated connection between a suspension member and a pendant article.

A further object is to enable the point at which the axis of the suspender meets the pendant article to be easily adjusted in order to correct any tendency of the article to hang at an unsuitable angle.

Another object is to provide a suspension-type lighting fitting for a tubular electric lamp, which is easily adjustable for the purpose of preventing the fitting from hanging with a lateral inclination owing to minor irregularities in manufacture.

Embodiments of the invention, as applied to the suspension of a fitting for a tubular electric discharge lamp will be described by way of example, and with reference to the accompanying drawings, in which:

Fig. 1 is a side elevation of part of such a fitting showing one of the suspension assemblies, Fig. 2 is a transverse section taken on the line 2—2 in Fig. 1, Fig. 3 is a section of an alternative to a part appearing in Figs. 1 and 2, and Figs. 4 and 5 are respectively a side elevation and a sectional side elevation of another alternative to a part appearing in Figs. 1 and 2.

The lamp fitting includes a sheet metal beam 10 (Figs. 1 and 2) having in its horizontal upper face two circular holes 3/4 in. in diameter and on its longitudinal centre line. One of these holes appears at 11 in Fig. 2. The suspension members may be two chains. such as 12 in Figs. 1 and 2, or cables or rods each having a hook 13 at its lower end.

These suspension members are attached to the fitting by similar attachment devices. Each of these devices includes a socket member in the form of a ferrule 14 consisting of a 7/8-in. length of brass tube 3/4 in. in external diameter and having a circumferential flange 15, 1 1/4 in. in diameter, at its lower end. Two 3/32-in. holes 16 and 17 are drilled respectively through opposite sides of the wall of this tube, the hole 16 being 1/16-in. higher than the hole 17.

An eye loop 18 is formed from a length of about 4 in. of 1/8-in. wire bent into symmetrical splayed hairpin form, with the ends 19 of its limbs turned in towards each other. After the ferrule 14 has been fitted through the hole 11 in the lamp fitting, the loop 18 is clenched onto the ferrule so as to engage the inturned ends 19 of the limbs of the loop in the holes 16 and 17 in the ferrule. Since these holes are at different heights above the flange 15 of the ferrule 14, the axis B—B of the loop 18 is inclined to the axis A—A of the ferrule 1 when the loop is engaged in the suspender hook 13, and the bend of the loop 18 lies at a distance $d$ to one side of the axis A—A of the ferrule. If the lamp fitting, when first suspended, hangs at an inclination, instead of level, with respect to the axis of the tubular lamp, the fitting can be made to hang truly by rotating one or both of the ferrules 14 as necessary to correct the error.

In the modification of this embodiment. shown in Fig. 3, the two holes 16A and 17A in the ferrule 14 are co-axial and the hooked portion 18A of the fastening member is set to one side of the axis of the ferrule.

If it is desired to enable the eccentricity of the eye to be variable, the holes in the ferrule 14 may be replaced by helical slots 16B and 17B (Figs. 3 and 4), one of opposite hand to the other. The inturned ends 19 of the eye loop limbs pass through these slots and engage in vertical slots 20 in a liner tube 21 rotatable in the ferrule 14 and serving to keep the loop ends 19 in a plane containing the ferrule axis. Rotation of the loop 18 relatively to the ferrule 14 about the ferrule axis varies the eccentricity of the bend of the loop with respect to this axis when the device is loaded.

I claim:

1. A device for use in attaching a suspension member to a pendant article and including a socket member having at its lower end a circumferential flange and rotatably mounted in and projecting upwards through a hole in the top of the pendant article with the flange bearing against the part of the under surface of said top that borders said hole, and a fastening member engaging said suspension member and engaged in two holes formed in opposite sides of the socket member. said fastening member serving to prevent the socket member from dropping out of the pendant article when the suspension is unloaded, the point of contact between said fastening member and said suspension member is eccentric with respect to the axis of said socket member.

2. A device as claimed in claim 1, wherein one of the said two holes formed in opposite sides of the socket member is higher than the other, and said fastening member is of symmetrical hairpin form, the ends of its limbs being turned towards each other and engaged in said holes respectively.

3. A device as claimed in claim 1, wherein the said fastening member is of a symmetrical form.

4. A device as claimed in claim 1, wherein the said holes are circular in section and have a common axis perpendicular to the axis of the socket member, and the said fastening member is of an unsymmetrical form.

5. A device as claimed in claim 1, wherein the said two holes formed in opposite sides of the socket member are helical slots of opposite hand.

6. A device as claimed in claim 1, wherein the said two holes formed in opposite sides of the socket member are helical slots of opposite hand, and the device includes an auxiliary member which is carried co-axially by and rotatable relatively to said socket member and which is provided with opposed longitudinal slots in which said fastening member is engaged.

7. A device for use in attaching a suspension member to a pendant article and including a socket member constituted by a tube rotatably mounted in and projecting upwards through a hole in the top of the pendant article, said tube having two opposed holes in its side walls above said top and at its lower end a facing bearing against the part of the under surface of said top that borders said hole, and a coupling link connected to the suspension member at a point which, when the suspension is loaded, is eccentric with respect to the axis of said tube, said link being engaged in said two holes.

8. A device attaching to a suspender a holder and reflector assembly for a tubular electric lamp, the device including a member mounted for rotation about a vertical axis in the top of said assembly, and a fastening member on said rotatable member and having an articulated connection with said suspender at a point which is eccentric with respect to said axis.

RAYMOND CHARLES KEMBER.

REFERENCES CITED

The following references are of record in the file of this patent:

UNITED STATES PATENTS

| Number | Name | Date |
|---|---|---|
| 70,884 | Oatley | Nov. 12, 1867 |
| 1,049,085 | Healy | Dec. 31, 1912 |
| 1,716,017 | White | June 4, 1929 |
| 1,789,124 | Wever | Jan. 13, 1931 |
| 2,297,877 | De Bruin | Oct. 6, 1942 |